United States Patent
Ushimaru et al.

(10) Patent No.: US 9,056,797 B2
(45) Date of Patent: Jun. 16, 2015

(54) HIGH ZIRCONIA FUSED CAST REFRACTORY

(71) Applicant: AGC CERAMICS CO., LTD., Minato-ku (JP)

(72) Inventors: Yukihiro Ushimaru, Tokyo (JP); Shinya Hayashi, Tokyo (JP)

(73) Assignee: AGC CERAMICS CO., LTD., Minato-ku (JP)

( * ) Notice: Subject to any disclaimer, the term of this patent is extended or adjusted under 35 U.S.C. 154(b) by 8 days.

(21) Appl. No.: 14/108,638

(22) Filed: Dec. 17, 2013

(65) Prior Publication Data

US 2014/0187408 A1 Jul. 3, 2014

(30) Foreign Application Priority Data

Dec. 28, 2012 (JP) ................................. 2012-288533

(51) Int. Cl.
*C04B 35/484* (2006.01)
*C04B 35/48* (2006.01)
(Continued)

(52) U.S. Cl.
CPC . *C04B 35/48* (2013.01); *C03B 5/43* (2013.01); *C04B 35/484* (2013.01); *C04B 35/657* (2013.01); *F27D 1/00* (2013.01); *C04B 2235/3244* (2013.01)

(58) Field of Classification Search
CPC ........ C04B 35/484; C03B 5/43; F27D 1/0006
See application file for complete search history.

(56) References Cited

U.S. PATENT DOCUMENTS 4,705,763 A 11/1987 Hayashi et al.
5,679,612 A * 10/1997 Endo et al. .................... 501/104
(Continued)

FOREIGN PATENT DOCUMENTS

CN 101830701 A 9/2010
EP 2 418 189 A1 2/2012
(Continued)

OTHER PUBLICATIONS

Extended European Search Report issued Feb. 25, 2014 in Patent Application No. 13005903.3.

*Primary Examiner* — Karl Group
(74) *Attorney, Agent, or Firm* — Oblon, McClelland, Maier & Neustadt, L.L.P.

(57) ABSTRACT

To provide a high zirconia fused cast refractory which has high corrosion resistance to molten glass and which is scarcely susceptible to cracking during its production. A high zirconia fused cast refractory which has a chemical composition comprising from 96.5 to 98.5 mass % of $ZrO_2$, from 0.8 to 2.7 mass % of $SiO_2$, from 0.04 to 0.35 mass % in a total amount of $Na_2O$ and $K_2O$, and from 0.02 to 0.18 mass % of $B_2O_3$, wherein contents of $Na_2O$, $K_2O$ and $B_2O_3$ satisfy the relation of the following formula (1) at the same time:

$$0.03 \geq C_{B2O3} - (C_{Na2O} + C_{K2O}) \qquad (1)$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

11 Claims, 1 Drawing Sheet

(51) Int. Cl.
  *C03B 5/43* (2006.01)
  *C04B 35/657* (2006.01)
  *F27D 1/00* (2006.01)

(56) References Cited

U.S. PATENT DOCUMENTS 7,598,195 B2 * 10/2009 Gupta et al. .................. 501/105
7,655,587 B2 * 2/2010 Boussant-Roux et al. .... 501/105
2012/0036895 A1 2/2012 Sato

FOREIGN PATENT DOCUMENTS

| | | |
|---|---|---|
| JP | 55-3319 | 1/1980 |
| JP | 59-12619 | 3/1984 |
| JP | 3-28175 | 2/1991 |
| JP | 9-2870 A | 1/1997 |
| JP | 2009-527454 | 7/2009 |

* cited by examiner

HIGH ZIRCONIA FUSED CAST REFRACTORY

TECHNICAL FIELD

The present invention relates to a high zirconia fused cast refractory, particularly to a high zirconia fused cast refractory useful for a glass melting furnace as a glass production kiln.

BACKGROUND ART

Heretofore, a high zirconia fused cast refractory comprising at least 80 mass % of $ZrO_2$ as a chemical component has been used as a refractory for a glass melting furnace. A high zirconia fused cast refractory has high corrosion resistance against molten glass and low contamination properties, and has been frequently used for a portion in contact with molten glass in a glass melting furnace. Such a high zirconia fused cast refractory is constituted by a large amount of zirconia crystal grains and a small amount of matrix glass filling spaces among such crystal grains.

In recent years, a demand for further raising the temperature for melting glass has been increasing, and even a high zirconia fused cast refractory may not sometimes adequately satisfy the corrosion resistance. Therefore, a refractory having a further higher corrosion resistance is desired for the glass melting furnace.

In a refractory utilizing zirconia crystals, in order to increase the corrosion resistance to high temperature molten glass, the content of $ZrO_2$ in the refractory may usually be increased, and various studies have been made for high zirconia fused cast refractories. As such high zirconia fused cast refractories, specifically high zirconia fused cast refractories having the content of $ZrO_2$ increased to a level of at least 90 mass %, further to a level of at least 95 mass % are known (e.g. Patent Documents 1 to 4).

In a high zirconia fused cast refractory having the content of $ZrO_2$ increased to a level of at least 95 mass %, the matrix glass is 5 mass % at the maximum i.e. its proportion to the entire refractory is small. However, the physical properties of the matrix glass contribute substantially to the physical properties of the refractory, e.g. reduction of residual volume expansion (hereinafter referred to simply as residual expansion), suppression of leakage of matrix glass, or prevention of cracking during the production. Therefore, in a high zirconia fused cast refractory, optimal adjustment of the glass composition of the matrix glass, particularly adjustment of the contents of very small amount components, is important.

Further, with a high zirconia fused cast refractory having the content of $ZrO_2$ increased to a level of at least 95%, the refractory was susceptible to cracking, and it was difficult to produce it in a size useful as a furnace material for a glass kiln. Usually, a high zirconia fused cast refractory is produced by melting a raw material for the refractory at a high temperature of at least 2,500° C., followed by cooling in a casting mold. As the zirconia content in the refractory becomes high, the melting temperature becomes higher, and cracking is likely to result when a large size refractory is to be produced.

PRIOR ART DOCUMENTS

Patent Documents

Patent Document 1: JP-A-3-28175
Patent Document 2: JP-B-59-12619
Patent Document 3: JP-A-2009-527454
Patent Document 4: JP-B-55-3319

DISCLOSURE OF INVENTION

Technical Problem

As mentioned above, in recent years, high zirconia fused cast refractories having the corrosion resistance improved to a very high level have been known, and it is further desired to develop a refractory which is not susceptible to cracking during the production of a large size refractory or during its use as a furnace material for a glass kiln.

Patent Document 1 discloses a cast refractory product comprising at least 92 wt % of $ZrO_2$, from 2 to 6.5 wt % of $SiO_2$, from 0.12 to 1.0 wt % of $Na_2O$, from 0.4 to 1.15 wt % of $Al_2O_3$, at most 0.55 wt % of $Fe_2O_3+TiO_2$ and at most 0.05 wt % of $P_2O_5$. However, this refractory product does not contain $B_2O_3$, and if it is attempted to produce a large size refractory with such a composition, cracking is likely to occur during its production.

Patent Document 2 discloses a high zirconia fused cast refractory comprising from 85 to 97 wt % of $ZrO_2$, from 0.1 to 3 wt % of $P_2O_5$, from 2 to 10 wt % of $SiO_2$, and up to 3 wt % at the maximum of $Al_2O_3$, and containing substantially no rare earth oxides. However, like in Patent Document 1, this refractory does not contain $B_2O_3$, and if it is attempted to produce a large size refractory with such a composition, cracking is likely to occur during its production.

Patent Document 3 discloses a fused cast refractory having a high zirconia content, which comprises at least 85 wt % of $ZrO_2+HfO_2$, from 1 to 10 wt % of $SiO_2$, from 0.1 to 2.4 wt % of $Al_2O_3$, at most 1.5 wt % of $B_2O_3$, and a prescribed weight amount of a dopant selected from the group consisting of $CrO_3$, $Nb_2O_5$, $MoO_3$, $Ta_2O_5$, $WO_3$ and a mixture thereof. However, this refractory is one designed to improve the corrosion resistance to glass by incorporating a predetermined amount of a dopant selected from the above group, and thus it is different in object from the present invention and is inadequate in the countermeasure against cracking during the production of the refractory. Further, this refractory does not contain $Na_2O$ or $K_2O$, whereby it is likely that the viscosity of the matrix glass becomes high, and the residual expansion becomes high.

Patent Document 4 discloses a high zirconia fused cast refractory comprising from 90 to 98% of $ZrO_2$, from 0.1 to 1.0% of CuO or $B_2O_5$, or in total of both, wherein a ratio of $Al_2O_3$ to $SiO_2$ ($Al_2O_3/SiO_2$) is at most 0.5, and each of $Fe_2O_3$ and $TiO_3$ is not contained more than 0.3%. However, in this document, there is no specific disclosure of a case where $ZrO_2$ is at least 96.5 mass %, improvement in the corrosion resistance is inadequate, and further, $Al_2O_3$ is contained in a relatively large amount, whereby it is likely that the viscosity of the matrix glass becomes to be so low that it may leak into molten glass.

Under the circumstances, in order to overcome the above problem, it is an object of the present invention to provide a high zirconia fused cast refractory which is capable of preventing cracking during its production and is free from cracking during its use as a furnace material, while having very high corrosion resistance to molten glass.

Solution to Problem

The present inventors have conducted an extensive study and as a result, found that in a refractory having a $ZrO_2$ content of at least 96.5% and having high corrosion resistance to molten glass, by optimizing the refractory composition, it is possible to obtain a high zirconia fused cast refractory which is capable of preventing cracking and has low residual expansion even if the fused cast refractory is made to be large sized.

That is, the high zirconia fused cast refractory of the present invention has a chemical composition comprising from 96.5 to 98.5 mass % of $ZrO_2$, from 0.8 to 2.7 mass % of $SiO_2$, from 0.04 to 0.35 mass % in a total amount of $Na_2O$ and $K_2O$, and form 0.02 to 0.18 mass % of $B_2O_3$, wherein contents of $Na_2O$, $K_2O$ and $B_2O_3$ satisfy the relation of the following formula (1) at the same time:

$$0.03 \geq C_{B2O3} - (C_{Na2O} + C_{K2O}) \quad (1)$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

Advantageous Effects of Invention

According to the high zirconia fused cast refractory of the present invention, its $ZrO_2$ content is high, whereby it exhibits high corrosion resistance, and the contents of components other than the $ZrO_2$ component are optimized, whereby it is possible to prevent cracking in the refractory and to reduce the residual expansion of the refractory, during the production of a large sized high zirconia fused cast refractory.

DESCRIPTION OF EMBODIMENTS

Figure 1:
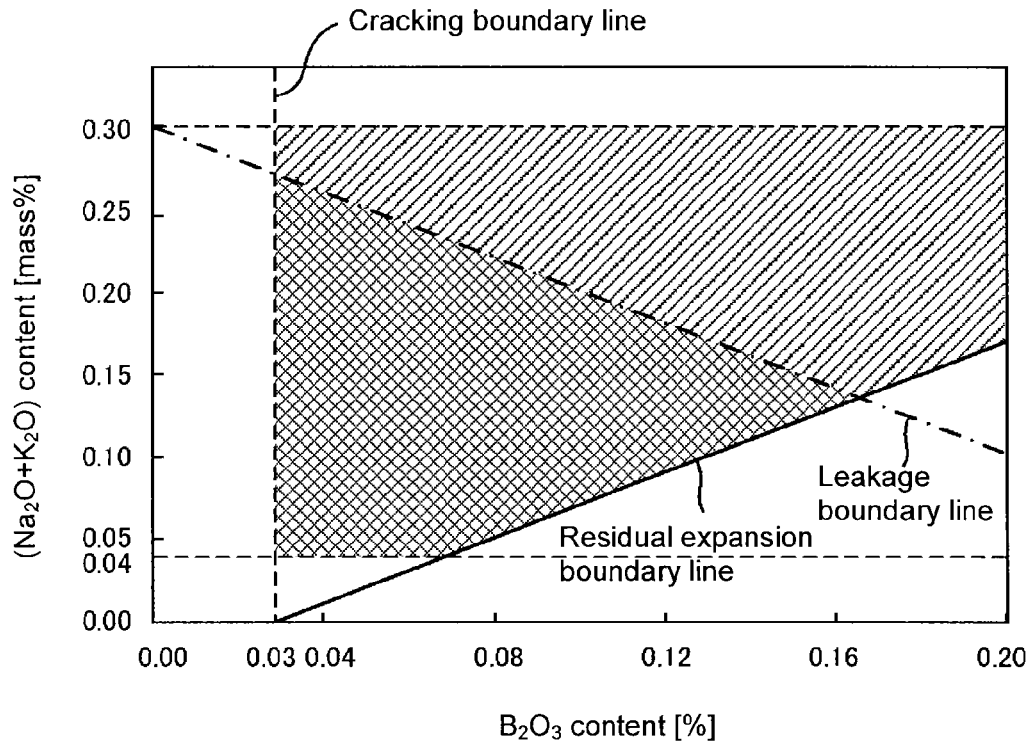
FIG. 1 is a graph showing, in the relation of the contents of $Na_2O$, $K_2O$ and $B_2O_3$, preferred ranges and boundary lines for the respective properties i.e. residual expansion of the refractory, cracking during the production, and leakage.

The high zirconia fused cast refractory of the present invention is a high zirconia fused cast refractory which comprises the above components in the predetermined blend ratio and which is constituted by a large amount of zirconia crystals and a small amount of matrix glass, and slight pores. The roles which the respective chemical components contained in the refractory will play in the refractory, will be described below.

In the high zirconia fused cast refractory of the present invention, $ZrO_2$ is a component to increase the corrosion resistance of the refractory to molten glass, and is an essential component.

The content of this $ZrO_2$ is from 96.5 to 98.5 mass % in the high zirconia fused cast refractory. When it contains at least 96.5 mass % of $ZrO_2$, it becomes a refractory excellent in the corrosion resistance to molten glass, as compared with a conventional high zirconia fused cast refractory. On the other hand, if the content exceeds 98.5 mass %, the contents of matrix glass and other components tend to be too small, whereby cracking is likely to occur during the production, and it tends to be difficult to increase the size of the refractory.

With a view to securing the content of matrix glass while maintaining high durability to molten glass, the $ZrO_2$ content is preferably from 96.8 to 98.2 mass %, more preferably from 97.2 to 98.0 mass %.

Further, zirconia raw material and zircon raw material to be used for the production of the high zirconia fused cast refractory, inevitably contain from 1 to 3 mass % of $HfO_2$. And $HfO_2$ will not substantially be lost e.g. by vaporization during the production and will remain in the refractory, and therefore, in a usual high zirconia fused cast refractory, $HfO_2$ derived from raw materials is contained. $HfO_2$ usually plays the same role as $ZrO_2$ in a high zirconia fused cast refractory, and therefore, it is usual that the value of $ZrO_2+HfO_2$ is represented simply by $ZrO_2$. Also in this specification, the value of $ZrO_2+HfO_2$ is represented by $ZrO_2$.

In the high zirconia fused cast refractory of the present invention, $SiO_2$ is a component to form matrix glass and is an essential component.

The content of this $SiO_2$ is from 0.8 to 2.7 mass % in the high zirconia fused cast refractory. When $SiO_2$ is contained in an amount of at least 0.8 mass %, it is possible to relax the thermal stress to a temperature change during the production and to prevent cracking. On the other hand, if the content exceeds 2.7 mass %, the proportion of $SiO_2$ in the matrix glass becomes high, whereby the viscosity of the matrix glass becomes high, and it is likely that cracking occurs during the production of the refractory. The $SiO_2$ content is preferably from 1.0 to 2.4 mass %, more preferably from 1.2 to 2.1 mass %.

In the high zirconia fused cast refractory of the present invention, $Na_2O$ and $K_2O$ are components to prevent cracking during the production of the refractory and are selective essential components such that at least either one is contained. That is, the refractory may contain $Na_2O$ alone or $K_2O$ alone, or may contain both of $Na_2O$ and $K_2O$.

The content of such $Na_2O$ and $K_2O$ is from 0.04 to 0.35 mass % in their total amount in the high zirconia fused cast refractory. When the total content of $Na_2O$ and $K_2O$ is at least 0.04 mass %, formation of zircon crystals in the refractory is suppressed, which will contribute to prevention of cracking during the production of the refractory. As the total content of $Na_2O$ and $K_2O$ is higher, the viscosity of the matrix glass may be made to be lower, but if the total content of $Na_2O$ and $K_2O$ exceeds 0.35 mass %, alkali components become too much, whereby vitrification tends to be difficult. Therefore, for adjustment of the contents of other components in the matrix glass, the total content of $Na_2O$ and $K_2O$ is at most 0.35 mass %.

The total content of $Na_2O$ and $K_2O$ is preferably from 0.06 to 0.30 mass %, more preferably from 0.08 to 0.25 mass %. Further, it is preferred that $Na_2O$ is contained alone, and in such a case, the content is preferably from 0.06 to 0.25 mass %, more preferably from 0.08 to 0.18 mass %.

In the high zirconia fused cast refractory of the present invention, $B_2O_3$ is a component to prevent cracking during the production of the refractory and is an essential component.

The content of this $B_2O_3$ is from 0.03 to 0.3 mass % in the high zirconia fused cast refractory, since it can exhibit its effect with a small amount. If the content exceeds 0.3 mass %, the formation of zircon crystals in the refractory is likely to be accelerated, and if the content is less than 0.03 mass %, the effect to prevent cracking during the production of the refractory tends to be inadequate. The $B_2O_3$ content is preferably from 0.04 to 0.20 mass %, more preferably from 0.05 to 0.15 mass %.

In the high zirconia fused cast refractory of the present invention, $Al_2O_3$ is a component to lower the viscosity of matrix glass and at the same time, is a component to prevent formation of zircon crystals in the refractory, and it is not an essential component. Zircon crystals will be formed by a reaction of a part of matrix glass with zirconia crystals. Once zircon is formed, the amount of matrix glass in the refractory decreases, whereby the function of the matrix glass may not be adequately obtainable. Further, the decrease of the matrix glass tends to have the residual expansion of the refractory increased and thus is likely to cause cracking during the use as a furnace material for a glass kiln.

The content of this $Al_2O_3$ is from 0.1 to 0.6 mass % in the high zirconia fused cast refractory. In the present invention, the amount of matrix glass is small relative to zirconia crystals, whereby $Al_2O_3$ can exhibit its effect with a content of at least 0.1 mass %. On the other hand, if the content exceeds 0.6 mass %, the viscosity of matrix glass tends to be too low, and aluminosilicate type crystals such as mullite are likely to be formed during the production or use of the refractory, whereby the amount of matrix glass is likely to be decreased. The $Al_2O_3$ content is preferably from 0.2 to 0.4 mass %, more preferably from 0.3 to 0.4 mass %.

In the high zirconia fused cast refractory of the present invention, $P_2O_5$ is a component to adjust the viscosity of matrix glass and prevent cracking during the production of the refractory, and it is not an essential component.

From the above viewpoint, the content of this $P_2O_5$ is preferably from 0.03 to 0.15 mass % in the high zirconia fused cast refractory. In such a case, it can exhibit its effect with a small amount. The $P_2O_5$ content is preferably from 0.03 to 0.12 mass %, more preferably from 0.03 to 0.06 mass %.

On the other hand, if $P_2O_5$ is contained, formation of zircon crystals is likely to be accelerated, and with a view to preventing chipping off or residual expansion, the $P_2O_5$ content should better be as low as possible. Its content is more preferably at most 0.04 mass %, particularly preferably substantially no content, in the high zirconia fused cast refractory. Here, "substantially no content" means that the component is not intentionally incorporated and means that its inclusion due to unavoidable impurities is permissible.

In the high zirconia fused cast refractory of the present invention, CuO is a component which is likely to color molten glass or which is, when contained together with the above-mentioned $P_2O_5$ or $B_2O_3$, likely to form low melting point glass and deteriorate chemical durability. Therefore, in the present invention, CuO should not better be substantially contained.

Further, $Fe_2O_3$ and $TiO_2$ are likely to be contained as impurities in raw materials. These components are components to cause bubbling or coloration to molten glass, and should not be contained in large amounts. When such $Fe_2O_3$ and $TiO_2$ are at most 0.3 mass % in their total amount, there will be no problem of coloration, and they are preferably at most 0.2 mass % in total.

Likewise, $Y_2O_3$ is likely to be contained as an impurity depending upon raw materials. If $Y_2O_3$ is contained in the refractory, the matrix glass tends to be hard, and it tends to increase the residual expansion in a heat cycle test. When the content of $Y_2O_3$ is at most 0.3 mass %, there will be no problem, and it is preferably at most 0.2 mass %.

Likewise, MgO and CaO are likely to be contained as impurities in raw materials. They tend to increase the residual expansion in a heat cycle test. When the content each of MgO and CaO is at most 0.05 mass %, there will be no problem, and it is preferably at most 0.03 mass %.

And, in the present invention, contents of $Na_2O$, $K_2O$ and $B_2O_3$ being very small amount components in matrix glass satisfy the relation of the following formula (1):

$$0.03 \geq C_{B2O3} - (C_{Na2O} + C_{K2O}) \tag{1}$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

When the relation of this formula (1) is satisfied, the residual expansion of a high zirconia fused cast refractory to be produced, becomes to be at most 25%, and it is possible to effectively prevent cracking in its use as a furnace material for a glass kiln. Here, in this specification, the residual expansion is a volume change led from a dimensional change as between before and after a heat cycle test wherein a sample is subjected to repetition of the temperature change cycle for 40 times between 800° C. and 1,250° C. That is, the residual expansion is calculated by the following formula:

Residual expansion=(Volume after heat cycle test/volume before heat cycle test)−1)×100

With a view to preventing the residual expansion of the refractory, contents of $Na_2O$, $K_2O$ and $B_2O_3$ preferably satisfy the relation of the following formula (2), and more preferably satisfy the relation of the following formula (3):

$$0.02 \geq C_{B2O3} - (C_{Na2O} + C_{K2O}) \tag{2}$$

$$0.01 \geq C_{B2O3} - (C_{Na2O} + C_{K2O}) \tag{3}$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

Further, in the present invention, contents of $B_2O_3$, $Na_2O$ and $K_2O$ being very small amount components in matrix glass satisfy the relation of the following formula (4):

$$C_{Na2O} + C_{K2O} + C_{B2O3} \leq 0.3 \tag{4}$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

That is, the total amount of $B_2O_3$, $Na_2O$ and $K_2O$ is preferably at most 0.3 mass %. When the relation of this formula (4) is satisfied, the matrix glass in a high zirconia fused cast refractory to be produced, will maintain a proper viscosity, and it is possible to effectively prevent leakage of the matrix glass during the use for a melting furnace.

If the total amount of such $B_2O_3$, $Na_2O$ and $K_2O$ exceeds 0.3 mass %, the matrix glass in the refractory tends to be too soft, and if subjected to a high temperature like a glass melting furnace, the matrix glass is likely to leak to the surface of the refractory. Thus, in such a case, leaked glass is likely to be included in molten glass to cause contamination.

With a view to preventing the leakage of matrix glass of the refractory, contents of $Na_2O$, $K_2O$ and $B_2O_3$ more preferably satisfy the relation of the following formula (5), and further preferably satisfy the relation of the following formula (6):

$$C_{Na2O} + C_{K2O} + C_{B2O3} \leq 0.27 \tag{5}$$

$$C_{Na2O} + C_{K2O} + C_{B2O3} \leq 0.24 \tag{6}$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

The relation of the above formulae (1) and (4) will be described with reference to FIG. 1. FIG. 1 is a graph showing the relation of the contents of $Na_2O$, $K_2O$ and $B_2O_3$ being very small amount components in the refractory. In FIG. 1, the ordinate represents the total content of $Na_2O$ and $K_2O$, and the abscissa represents the content of $B_2O_3$. The cracking boundary line in FIG. 1 is a line in a case where the $B_2O_3$ content is 0.03 mass %, irrespective of the total content of $Na_2O$ and $K_2O$. The residual expansion boundary line in FIG. 1 is a boundary line represented by the formula (1) and is shown by a solid line. The leakage boundary line in FIG. 1 is a boundary line represented by the formula (4) and is shown by an alternate long and short dash line.

These very small amount components are contained in matrix glass and impart various properties to the refractory.

And, when these very small amount components are contained in the region (diagonal line region+lattice diagonal line region) defined by the cracking boundary line, the residual expansion boundary line, and the upper and lower limit values of the respective components, a refractory exhibiting the effects of the present invention is obtainable.

Further, in consideration of also the prevention of leakage of glass matrix, the very small amount components in matrix glass are preferably contained in the region (lattice diagonal line region) defined by the cracking boundary line, the residual expansion boundary line, the leakage boundary line and the upper and lower limit values of the respective components.

The bulk specific gravity of the high zirconia fused cast refractory is preferably at least 5.4 g/cm$^3$. The high zirconia fused cast refractory of the present invention should better be dense and have high corrosion resistance to molten glass. Accordingly, the bulk specific gravity is more preferably from 5.45 to 5.55 g/cm$^3$.

The porosity of the high zirconia fused cast refractory is preferably at most 1.5%. The high zirconia fused cast refractory of the present invention should better have high corrosion resistance to molten glass. The porosity is adversely influential to the corrosion resistance, and such porosity should better be as low as possible. Accordingly, the porosity is more preferably from 0.1 to 1.0%.

The mass of the high zirconia fused cast refractory is preferably at least 200 kg. The high zirconia fused cast refractory of the present invention is capable of preventing cracking in the refractory even at the time of producing such a large size fused cast refractory and capable of remarkably improving the yield of the large size product as compared to heretofore. The mass is more preferably from 400 to 1,500 kg.

EXAMPLES

Now, the high zirconia fused cast refractory of the present invention will be described specifically with reference to Examples of the present invention (Ex 1 to Ex 18) and Comparative Examples (Ex 19 to Ex 30), but it should be understood that the present invention is by no means restricted by the following description.

In order to obtain a high zirconia fused cast refractory by an electrically fusing and casting method, raw materials such as alumina, zircon sand, silica, sodium carbonate, potassium carbonate, $B_2O_3$, $P_2O_5$, etc. were blended to desilicated zircon as a zirconia raw material, to obtain mixed raw materials, and such mixed raw materials were introduced into a three phase arc electric furnace with an output power of 1,500 kVA equipped with three graphite electrodes and completely melted by Joule heating.

450 kg of this melt was poured into a graphite mold preliminarily embedded in silica sand as an annealing material, cast and left to cool to a temperature in the vicinity of room temperature. This graphite mold was prepared to obtain a material for a refractory product of 200 mm in thickness×300 mm in width×700 mm in height containing no shrinkage cavity. Specifically, the mold was designed and prepared so as to obtain an ingot having a feeder portion with the same volume as the material portion for the refractory product, provided above the material portion for the refractory product.

After the casting and cooling, the ingot and the graphite mold were taken out from the annealing material, and the graphite mold and the ingot were separated to produce a high zirconia fused cast refractory.

By adjusting the raw material compositions, high zirconia fused cast refractories having chemical compositions as identified in Tables 1 and 2 were obtained. Here, Table 1 shows Examples of the present invention (Ex 1 to Ex 18) and Table 2 shows Comparative Examples (Ex 19 to Ex 30). With respect to the chemical composition in the refractory, values are basically quantitatively analyzed values determined by a wavelength dispersive X-ray fluorescence spectrometry, but values for $B_2O_3$ and $P_2O_5$ which require precision are quantitatively analyzed values determined by an inductively-coupled plasma emission spectrophotometry. However, quantitative determination for the respective components is not limited to such analysis methods, and can be carried out by another quantitative analysis method. Further, "Other" in Tables 1 and 2 is the total content of components not shown in the Tables.

TABLE 1

| | Composition (mass %) | | | | | | | Data of relation formulae | |
|---|---|---|---|---|---|---|---|---|---|
| | $ZrO_2$ | $SiO_2$ | $Al_2O_3$ | $Na_2O + K_2O$ | $B_2O_3$ | $P_2O_5$ | Other | $C_{B2O3} - (C_{Na2O} + C_{K2O})$ | $C_{Na2O} + C_{K2O} + C_{B2O3}$ |
| Ex. 1 | 97.75 | 1.70 | 0.41 | 0.07 | 0.05 | 0.02 | 0.00 | −0.02 | 0.12 |
| Ex. 2 | 97.99 | 1.40 | 0.45 | 0.09 | 0.05 | 0.02 | 0.00 | −0.04 | 0.14 |
| Ex. 3 | 98.48 | 1.00 | 0.35 | 0.10 | 0.05 | 0.02 | 0.00 | −0.05 | 0.15 |
| Ex. 4 | 98.18 | 1.30 | 0.35 | 0.09 | 0.07 | 0.01 | 0.00 | −0.02 | 0.16 |
| Ex. 5 | 98.33 | 1.20 | 0.30 | 0.08 | 0.07 | 0.02 | 0.00 | −0.01 | 0.15 |
| Ex. 6 | 97.65 | 1.80 | 0.35 | 0.09 | 0.09 | 0.02 | 0.00 | 0.00 | 0.18 |
| Ex. 7 | 97.74 | 1.70 | 0.32 | 0.09 | 0.12 | 0.03 | 0.00 | 0.03 | 0.21 |
| Ex. 8 | 98.26 | 1.20 | 0.35 | 0.08 | 0.08 | 0.03 | 0.00 | 0.00 | 0.16 |
| Ex. 9 | 97.62 | 1.90 | 0.32 | 0.11 | 0.03 | 0.02 | 0.00 | −0.08 | 0.14 |
| Ex. 10 | 98.23 | 1.40 | 0.29 | 0.04 | 0.03 | 0.01 | 0.00 | −0.01 | 0.07 |
| Ex. 11 | 98.42 | 1.10 | 0.34 | 0.08 | 0.03 | 0.03 | 0.00 | −0.05 | 0.11 |
| Ex. 12 | 96.88 | 2.50 | 0.39 | 0.11 | 0.10 | 0.02 | 0.00 | −0.01 | 0.21 |
| Ex. 13 | 97.43 | 2.10 | 0.30 | 0.16 | 0.08 | 0.02 | 0.00 | −0.08 | 0.24 |
| Ex. 14 | 97.59 | 1.80 | 0.35 | 0.19 | 0.07 | 0.00 | 0.00 | −0.12 | 0.26 |
| Ex. 15 | 97.72 | 1.70 | 0.26 | 0.21 | 0.09 | 0.02 | 0.00 | −0.12 | 0.30 |
| Ex. 16 | 97.98 | 1.40 | 0.34 | 0.19 | 0.07 | 0.02 | 0.00 | −0.12 | 0.26 |
| Ex. 17 | 97.84 | 1.40 | 0.37 | 0.28 | 0.07 | 0.04 | 0.00 | −0.21 | 0.35 |
| Ex. 18 | 97.71 | 1.50 | 0.40 | 0.27 | 0.09 | 0.03 | 0.00 | −0.18 | 0.36 |

| | Bulk specific gravity | Cracking | Residual expansion | Leakage | Corrosion resistance | Overall |
|---|---|---|---|---|---|---|
| Ex. 1 | 5.44 | ⊚ | ⊚ | ⊚ | ⊚ | ⊚ |
| Ex. 2 | 5.44 | ⊚ | ⊚ | ⊚ | ⊚ | ⊚ |

TABLE 1-continued

| | | | | | | | |
|---|---|---|---|---|---|---|---|
| Ex. 3 | 5.49 | ◎ | ◎ | ◎ | ◎ | ◎ | ◎ |
| Ex. 4 | 5.52 | ◎ | ◎ | ◎ | ◎ | ◎ | ◎ |
| Ex. 5 | 5.52 | ◎ | ◎ | ◎ | ◎ | ◎ | ◎ |
| Ex. 6 | 5.48 | ◎ | ◎ | ◎ | ◎ | ◎ | ◎ |
| Ex. 7 | 5.52 | ◎ | ◎ | ◎ | ◎ | ◎ | ◎ |
| Ex. 8 | 5.51 | ◎ | ◎ | ◎ | ◎ | ◎ | ◎ |
| Ex. 9 | 5.42 | ○ | ◎ | ◎ | ◎ | ◎ | ○ |
| Ex. 10 | 5.58 | ○ | ◎ | ◎ | ◎ | ◎ | ○ |
| Ex. 11 | 5.56 | ○ | ◎ | ◎ | ◎ | ◎ | ○ |
| Ex. 12 | 5.45 | ◎ | ◎ | ◎ | ◎ | ◎ | ○ |
| Ex. 13 | 5.47 | ◎ | ◎ | ○ | ◎ | ◎ | ○ |
| Ex. 14 | 5.52 | ◎ | ◎ | ○ | ◎ | ◎ | ○ |
| Ex. 15 | 5.50 | ◎ | ◎ | ○ | ◎ | ◎ | ○ |
| Ex. 16 | 5.52 | ◎ | ◎ | ○ | ◎ | ◎ | ○ |
| Ex. 17 | 5.49 | ◎ | ◎ | Δ | ◎ | ◎ | ○ |
| Ex. 18 | 5.51 | ◎ | ◎ | Δ | ◎ | ◎ | ○ |

TABLE 2

| | Composition (mass %) | | | | | | | Data of relation formulae | |
|---|---|---|---|---|---|---|---|---|---|
| | $ZrO_2$ | $SiO_2$ | $Al_2O_3$ | $Na_2O + K_2O$ | $B_2O_3$ | $P_2O_5$ | Other | $C_{B2O3} - (C_{Na2O} + C_{K2O})$ | $C_{Na2O} + C_{K2O} + C_{B2O3}$ |
| Ex. 19 | 96.50 | 2.80 | 0.43 | 0.25 | 0.00 | 0.02 | 0.00 | −0.25 | 0.25 |
| Ex. 20 | 97.43 | 1.90 | 0.44 | 0.20 | 0.01 | 0.02 | 0.00 | −0.19 | 0.21 |
| Ex. 21 | 97.85 | 1.50 | 0.36 | 0.25 | 0.02 | 0.02 | 0.00 | −0.23 | 0.27 |
| Ex. 22 | 98.20 | 1.20 | 0.38 | 0.19 | 0.02 | 0.01 | 0.00 | −0.17 | 0.21 |
| Ex. 23 | 97.93 | 1.40 | 0.55 | 0.03 | 0.07 | 0.02 | 0.00 | 0.04 | 0.10 |
| Ex. 24 | 98.24 | 1.20 | 0.35 | 0.07 | 0.12 | 0.02 | 0.00 | 0.05 | 0.19 |
| Ex. 25 | 97.68 | 1.70 | 0.41 | 0.06 | 0.14 | 0.01 | 0.00 | 0.08 | 0.20 |
| Ex. 26 | 97.77 | 1.40 | 0.55 | 0.11 | 0.15 | 0.02 | 0.00 | 0.04 | 0.26 |
| Ex. 27 | 98.06 | 1.20 | 0.32 | 0.03 | 0.36 | 0.03 | 0.00 | 0.33 | 0.39 |
| Ex. 28 | 96.34 | 2.70 | 0.60 | 0.31 | 0.00 | 0.05 | 0.00 | −0.31 | 0.31 |
| Ex. 29 | 98.13 | 1.20 | 0.35 | 0.11 | 0.19 | 0.02 | 0.00 | 0.08 | 0.30 |
| Ex. 30 | 95.54 | 3.30 | 0.77 | 0.33 | 0.00 | 0.06 | 0.00 | −0.33 | 0.33 |

| | Properties | | | | | |
|---|---|---|---|---|---|---|
| | Bulk specific gravity | Cracking | Residual expansion | Leakage | Corrosion resistance | Overall |
| Ex. 19 | 5.44 | X | ◎ | ○ | ◎ | X |
| Ex. 20 | 5.50 | X | ◎ | ○ | ◎ | X |
| Ex. 21 | 5.52 | X | ◎ | ○ | ◎ | X |
| Ex. 22 | 5.53 | X | ◎ | ○ | ◎ | X |
| Ex. 23 | 5.49 | ◎ | X | ◎ | ◎ | X |
| Ex. 24 | 5.48 | ◎ | X | ◎ | ◎ | X |
| Ex. 25 | 5.49 | ◎ | X | ◎ | ◎ | X |
| Ex. 26 | 5.49 | ◎ | X | ◎ | ◎ | X |
| Ex. 27 | 5.52 | ◎ | X | ◎ | ◎ | X |
| Ex. 28 | 5.33 | X | ◎ | X | ○ | X |
| Ex. 29 | 5.54 | ◎ | X | ◎ | ◎ | X |
| Ex. 30 | 5.38 | X | ◎ | X | X | X |

[Cracking]

Cracking in an outer appearance of the ingot was evaluated as follows.

First, from the ingot of the high zirconia fused cast refractory, the feeder portion was removed to produce a fused cast refractory of 200 mm in thickness×300 mm in width×700 mm in height (mass: about 230 kg). Then, presence or absence of cracks which could be visually confirmed when the surface of the fused cast refractory was ground, was evaluated by the following standards.

◎: When 15 mm from the surface is ground and removed, substantially all cracks can be removed.

○: When 30 mm from the surface is ground and removed, substantially all cracks can be removed.

X: Even when 30 mm from the surface is ground and removed, cracks cannot be removed.

With respect to a high zirconia fused cast refractory, when a large ingot is produced, cracks may be formed on its surface, and depending upon the depth of such cracks, the size of the finally obtainable refractory product will be determined. If cracks are deep, it is required to prepare an ingot substantially larger than the dimension of the desired refractory product and then to grind or cut it with a high load, whereby production of such a refractory becomes very expensive and is not practical. Whereas, if the depth of cracks in the material for the refractory product is shallow, it is simply required to produce an ingot slightly larger than the dimension of the desired refractory product and to grind its surface slightly, whereby production of a large size refractory is easy. Therefore, the depth of cracks in an ingot for a refractory is preferably less than 20 mm, more preferably less than 10 mm.

[Residual Expansion]

A sample of 50 mm in thickness×50 mm in width×50 mm in height was cut out from a produced fused cast refractory, and subjected to repetition of heating and cooling between 800° C. and 1,250° C. for 40 times in an electric furnace. At that time, heating from room temperature to 800° C. was carried out at a rate of 160° C. per hour, and from this point, heating to 1,250° C. at a rate of 450° C. per hour immediately after the temperature reached 800° C., and cooling to 800° C. at a rate of 450° C. per hour immediately after the temperature reached 1,250° C., were carried out for one heat cycle. The heat cycle between 800° C. and 1,250° C. was repeatedly carried out 40 times. After the final heat cycle, the sample was cooled from 800° C. to room temperature at a rate of 160° C. per hour. The dimensions of the sample were measured before and after the test, and the residual expansion was determined from the change in the dimensions. The residual expansion thus obtained was evaluated by the following standards.

⊚: The residual expansion is at most 15%.
○: The residual expansion is at most 25%.
X: The residual expansion exceeds 25%.

[Leakage]

A sample of 30 mm in diameter×30 mm in height was cut out from a produced fused cast refractory, and heated at 1,500° C. for 16 hours. After the heating, leakage of glass at the surface of the sample was visually confirmed and evaluated by the following standards.

⊚: No leakage is observed.
○: From 1 to 3 leakages are observed.
Δ: From 4 to 6 leakages are observed.
X: At least 7 leakages are observed.

[Corrosion Resistance]

A sample of 24 mm in thickness×12 mm in width×105 mm in height was cut out from a produced fused cast refractory, and immersed in glass at 1680° C. for 48 hours, whereby the corrosion depth was evaluated by the following standards. For the corrosion depth, the corrosion amount of a sample was relatively represented by mass % based on the corrosion amount (100%) when a refractory having a $ZrO_2$ content of 95 mass % (trade name: ZB-X950, manufactured by AGC Ceramics Co., Ltd) was subjected to the above corrosion test, and it was evaluated by the following standards.

⊚: The corrosion amount is at most 88%.
○: The corrosion amount is at most 92%.
X: The corrosion amount exceeds 92%.

[Overall Evaluation]

The overall evaluation was made with respect to the property evaluations of the above four items, by the following standards.

⊚: Evaluations in all of the above four items are ⊚
○: Evaluation in the corrosion resistance is ⊚, and evaluations in all of the remaining three items are not X.
X: Evaluation in at least one of the above four items is X.

Figure 2:
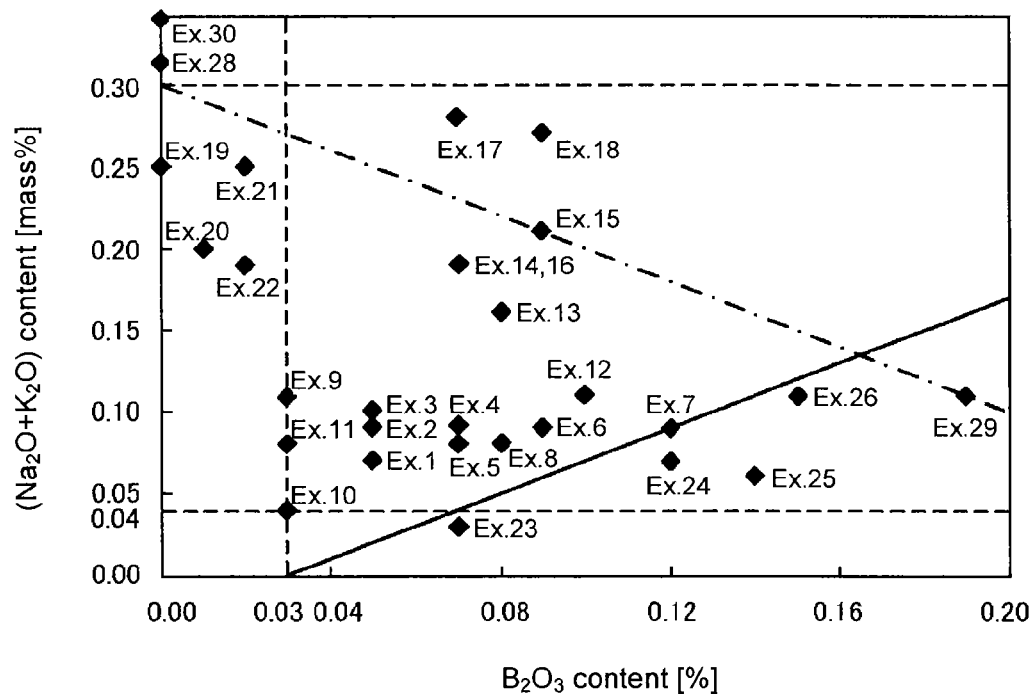
FIG. 2 is a graph of FIG. 1 wherein the contents in Examples of the present invention and in Comparative Examples are plotted.

The above test results are shown in Tables 1 and 2. Further, FIG. 2 is a graph wherein the relations of the contents of $Na_2O$, $K_2O$ and $B_2O_3$ in the refractories in Ex 1 to 26 and Ex 28 to 30 are plotted.

As evident from Table 1, the high zirconia fused cast refractories in Ex 1 to 18 are excellent in corrosion resistance and thus is suitable for use in a glass melting furnace (particularly even in the case of high temperature melting). And, the depth of cracks formed in the produced ingots is shallow, whereby the production efficiency can be improved, and it is further possible to produce large size cast refractories. Further, such a high zirconia fused cast refractory has a small residual expansion and high cracking resistance to a temperature change during its use, and thus can be made to be a cast refractory having a long useful life. Furthermore, leakage of matrix glass can sufficiently be prevented, and there will be little leakage of the glass component in the refractory into molten glass, and there will be little possibility of contamination to the molten glass.

Table 2 shows high zirconia fused cast refractories not belonging to the present invention, as Comparative Examples.

In refractories in Ex 19 to 22, Ex 28 and Ex 30, the $B_2O_3$ content was low, whereby deep cracks were formed during their production, and even when 20 mm from the surface of the ingots was ground, it was not possible to remove cracks. Thus, these refractories have a problem in productivity even if there were no problem with respect to corrosion resistance or cracking resistance to a temperature change, etc.

Ex 23 to 26 and Ex 29 are plotted on the lower side of the residual expansion boundary line. In each of them, the residual expansion to the heat cycle was high.

Ex 28 and Ex 30 are plotted in a region where the content of $B_2O_3$ is lower than the cracking boundary line, and the total content of $Na_2O$, $K_2O$ and $B_2O_3$ is high and in a region on the upper side of the leakage boundary line. In each of them, cracks were formed during the production of a large size refractory, and leakage of matrix glass was observed.

Although not plotted in FIG. 2, Ex 27 is an Example wherein the $B_2O_3$ content was high, and the difference between the total content of $Na_2O$ and $K_2O$ and the content of $B_2O_3$ was less than 0.03. This refractory had a high residual expansion, whereby the cracking resistance to a temperature change was inadequate.

From the foregoing results, it is evident that the high zirconia fused cast refractory of the present invention is a refractory which is excellent in productivity, while its zirconia content is very high, of which the residual expansion is low and leakage of glass is adequately prevented, and which is stable during its production and during its use.

INDUSTRIAL APPLICABILITY

The high zirconia fused cast refractory of the present invention has high corrosion resistance and is scarcely susceptible to cracking and free from contaminating molten glass even when applied to a glass melting furnace, and thus, it is useful particularly as a refractory for a glass melting furnace.

What is claimed is:

1. A high zirconia fused cast refractory which has a chemical composition comprising from 96.5 to 98.5 mass % of $ZrO_2$, from 0.8 to 2.7 mass % of $SiO_2$, from 0.04 to 0.35 mass % in a total amount of $Na_2O$ and $K_2O$, and from 0.02 to 0.18 mass % of $B_2O_3$, wherein contents of $Na_2O$, $K_2O$ and $B_2O_3$ satisfy the relation of the following formula (1) at the same time:

$$0.03 \geq C_{B2O3} - (C_{Na2O} + C_{K2O}) \tag{1}$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

2. The high zirconia fused cast refractory according to claim 1, which further contains from 0.1 to 0.6 mass % of $Al_2O_3$.

3. The high zirconia fused cast refractory according to claim 1, which contains substantially no CuO.

4. The high zirconia fused cast refractory according to claim 1, wherein the content of $P_2O_5$ is at most 0.04 mass %.

5. The high zirconia fused cast refractory according to claim 1, wherein the content of $Na_2O$ is from 0.04 to 0.25 mass %.

6. The high zirconia fused cast refractory according to claim 1, wherein the content of $Fe_2O_3+TiO_2$ is at most 0.3 mass %.

7. The high zirconia fused cast refractory according to claim 1, wherein each of the contents of MgO and CaO is at most 0.05 mass %.

8. The high zirconia fused cast refractory according to claim 1, wherein contents of $B_2O_3$, $Na_2O$ and $K_2O$ satisfy the relation of the following formula (4):

$$C_{Na2O}+C_{K2O}+C_{B2O3} \leq 0.3 \quad (4)$$

wherein $C_{Na2O}$ is the content of $Na_2O$, $C_{K2O}$ is the content of $K_2O$, and $C_{B2O3}$ is the content of $B_2O_3$, and each of these contents represents mass % in the refractory.

9. The high zirconia fused cast refractory according to claim 1, which has a bulk specific gravity of at least 5.4.

10. The high zirconia fused cast refractory according to claim 1, which has a porosity of at least 1.5%.

11. The high zirconia fused cast refractory according to a claim 1, which has a mass of at least 200 kg.

* * * * *